United States Patent [19]

Engelhardt et al.

[11] 4,304,569

[45] Dec. 8, 1981

[54] FORMULATION FOR BRIGHTENING SYNTHETIC FIBERS AND ITS PREPARATION AND USE

[75] Inventors: Friedrich Engelhardt; Karl Hintermeier, both of Frankfurt am Main; Herbert Friedrich, Heusenstamm; Thomas Martini, Bad Soden am Taunus, all of Fed. Rep. of Germany

[73] Assignee: Cassella AG., Frankfurt am Main, Fed. Rep. of Germany

[21] Appl. No.: 210,521

[22] Filed: Nov. 26, 1980

[30] Foreign Application Priority Data

Nov. 30, 1979 [DE] Fed. Rep. of Germany ....... 2948183

[51] Int. Cl.$^3$ ..................... C09B 67/00; C09K 11/06
[52] U.S. Cl. .......................................... 8/584; 8/529; 8/648; 252/301.21; 252/301.28; 252/301.29; 252/301.35
[58] Field of Search ............... 8/648, 584; 252/301.21, 252/301.35

[56] References Cited

U.S. PATENT DOCUMENTS

| | | | |
|---|---|---|---|
| 3,657,145 | 4/1972 | Mawse et al. | 252/345 |
| 4,012,463 | 3/1977 | Walsh et al. | 260/928 |
| 4,113,429 | 9/1978 | Kruse et al. | 8/490 |
| 4,126,412 | 11/1978 | Masson et al. | 8/584 |
| 4,231,749 | 11/1980 | Balland | 8/584 |

*Primary Examiner*—A. Lionel Clingman
*Attorney, Agent, or Firm*—Connolly and Hutz

[57] ABSTRACT

The formulation for brightening synthetic fibers or mixtures of synthetic fibers and natural fibers, which is an aqueous dispersion comprising at least one finely divided optical brightener and a dispersing agent, wherein the improvement comprises the dispersing agent being a water-soluble or water-dispersible polyester containing at least one phosphonic acid ester moiety.

15 Claims, No Drawings

FORMULATION FOR BRIGHTENING SYNTHETIC FIBERS AND ITS PREPARATION AND USE

Water-insoluble optical brighteners which are used for brightening synthetic fibres or mixtures of synthetic fibres and natural fibres are in general marketed as aqueous dispersions and contain one or more optical brighteners in finely divided form, one or more non-ionic dispersing agents and, if appropriate, other additives, such as, for example, anti-foaming agents, fungicides, wetting agents and the like. The dispersions are usually prepared by wet grinding processes. In these processes, one or more optical brighteners in aqueous suspension, together with a dispersing agent or grinding auxiliary, is ground by means of sand or glass beads in a stirred ball mill until the desired fine division is achieved. The remaining additives are then stirred in and the dispersion is sieved off from the grinding bodies. A large number of products have been disclosed as non-ionic dispersing agents (compare, for example, German Auslegeschriften Nos. 2,016,470 and 2,734,204, German Offenlegungsschrift No. 2,443,481, Austrian patent specification No. 196,343 and Swiss patent specification No. 427,722), but it is necessary to use large amounts of some of them, and, furthermore, some of them give dispersions with an insufficient storage stability. Polyvinyl alcohols are therefore used, above all, in practice, but these also have certain disadvantages. They are less suitable for some optical brighteners, are poorly soluble in water and their wetting capacity is also poor, so that, during grinding, the brightener is wetted only slowly, which leads to long grinding times. Some types of polyvinyl alcohols give dispersions which are not stable on storage, that is to say a gum-like sediment enriched with the brightener forms after some time. In addition, the polyvinyl alcohols do not assist the application of the brightener to the goods.

It has now been found, surprisingly, that a large number of water-insoluble optical brighteners, in particular optical brighteners which are difficult to apply and are to be used in the thermosol process, can be converted in a simple and reliable manner into aqueous dispersions which are stable on storage and have considerably improved tinctorial properties if a water-soluble or water-dispersible polyester containing phosphonic acid ester groups is used as the dispersing agent.

The invention accordingly relates to a formulation for brightening synthetic fibres which consists of an aqueous dispersion, containing dispersing agent and if appropriate other additives, of one or several finely divided optical brighteners. The formulation according to the invention is characterised in that a water-soluble or water-dispersible polyester containing phosphonic acid ester groups is used as the dispersing agent. The invention also relates to a process for the preparation of the formulation and its use for brightening synthetic fibres.

The water-soluble or water-dispersible polyester containing phosphonic acid ester groups which is used is, in particular, a mixed polyester which has an apparent average molecular weight of 800 to 5,000, preferably 1,000 to 3,000, measured in a vapour pressure osmometer using dimethylformamide as the solvent, and which consists to the extent of at least 5%, preferably to the extent of 20 to 50%, of chain members containing one or more phosphonic acid ester groups of the general formula I

wherein R denotes hydrogen or an aliphatic, cycloaliphatic, aromatic or araliphatic radical and the aliphatic radical and the aliphatic part of the araliphatic radical can also be interrupted by one or more oxygen atoms. In particular, R denotes hydrogen, an aliphatic radical with 1 to 22 C atoms, which can also be interrupted by one or more oxygen atoms, a cycloaliphatic radical with 5 to 8 C atoms, phenyl or naphthyl, it also being possible for the phenyl or naphthyl radical to be substituted by up to 3 alkyl radicals with in each case 1 to 6 C atoms, or an aliphatic radical which is substituted by phenyl and has 1 to 12 C atoms in the aliphatic radical and can also be interrupted by one or more oxygen atoms.

The polyester used, according to the invention, as the dispersing agent is prepared by a process in which dibasic acids A, and/or derivatives thereof, in particular esters, acid halides or anhydrides thereof, which are suitable for the preparation of polyesters are subjected to condensation reactions with dialcohols B or lower carboxylic acid esters thereof in a molar ratio of A:B of (80 to 140):(80 to 140), preferably (80 to 120):(90 to 130) in a manner which is in itself known until an apparent average molecular weight of 800 to 5,000, preferably 1,000 to 3,000, is reached, the starting compounds being chosen such that at least 5%, preferably 20 to 50%, of the chain members forming the polyester contain phosphonic acid ester groups of the formula I.

Dibasic acids A which are suitable for the preparation of the polyester are: A, (a) aromatic, araliphatic, cycloaliphatic and aliphatic dicarboxylic acids, (b) aliphatic, cycloaliphatic, araliphatic and aromatic phosphonic acids and (c) derivatives of A, (a) and A, (b), in particular esters, acid halides or anhydrides thereof, and mixtures of the substances A, (a), A, (b) and/or A, (c).

Possible dicarboxylic acids mentioned under A, (a) are all the dicarboxylic acids of the formula

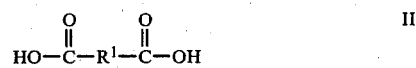

or, as compounds A, (c), their corresponding acid halides, anhydrides or esters, which can be used for the preparation of polyesters and which incorporate into the final polyester the chain member

wherein $R^1$ represents a direct bond or a divalent aliphatic, cycloaliphatic, aromatic or araliphatic radical, the carbon skeleton of which can also be interrupted by one or more hetero-atoms, such as, for example, oxygen or sulphur, or hetero-groups, such as, for example, $-SO_2-$. $R^1$ preferably denotes a divalent aliphatic radical with 2 to 10 C atoms, a divalent cycloaliphatic radical with 6 to 8 C atoms, a divalent aromatic radical with 6 to 12 C atoms or an araliphatic radical with 6 to 14 C atoms. Examples of suitable aliphatic, cycloaliphatic, aromatic and araliphatic dicarboxylic acids are: oxalic acid, malonic acid, succinic acid, methylmalonic acid, glutaric acid, dimethylmalonic acid, adipic acid, pimelic acid, suberic acid, 2,2-dimethylglutaric acid, azelaic acid, trimethyladipic acid, sebacic acid, fumaric acid, maleic acid, itaconic acid, citraconic acid, mesaconic acid, traumatic acid, muconic acid, 1,2-cyclohexane-dicarboxylic acid, 1,3-cyclohexane-dicarboxylic acid, 1,4-cyclohexane-dicarboxylic acid, norbornanedicarboxylic acid, phthalic acid, isophthalic acid, terephthalic acid, 1,4-naphthalene-dicarboxylic acid, 2,5-naphthalene-dicarboxylic acid, diphenic acid and acids of the general formula

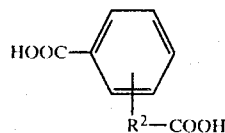

wherein $R^2$ denotes an alkylene radical which is in the ortho-, meta- or para-position and has 2 to 4 C atoms, for example 4-carboxyphenylacetic acid, 3- or 4-carboxyhydrocinnamic acid and 2- or 4-carboxy-γ-phenylbutyric acid. The preferred aromatic dicarboxylic acids are isophthalic acid and terephthalic acid because they are difficult to saponify. Examples of dicarboxylic acids in which the carbon skeleton is interrupted by heteroatoms, such as oxygen or sulphur, or hetero-groups, such as —$SO_2$—, are diglycolic acid, thiodiglycolic acid, thiodipropionic acid, 4,4'-oxydibenzoic acid, 4,4'-sulphonyldibenzoic acid and

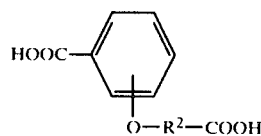

wherein $R^2$ denotes an alkylene radical with 2 to 4 C atoms and the side chain can be in the ortho-, meta- or para-position relative to the carboxyl group on the nucleus.

As already mentioned, the said dicarboxylic acids can also be used in the form of their derivatives, in particular in the form of their esters, anhydrides or acid halides. The preferred acid halides are the acid chlorides. Possible esters are monoesters or diesters with low, that is to say easily distillable, monoalcohols, thus, preferably, those with 1 to 4 carbon atoms, but also those with the dialcohols mentioned below. Suitable esters, anhydrides and acid chlorides are, for example: the dimethyl, diethyl, di-n-propyl, di-isopropyl and di-n-butyl esters of terephthalic acid; the dimethyl, diethyl, di-n-propyl, di-n-butyl and di-isobutyl esters of isophthalic acid; the dimethyl, diethyl, di-n-propyl, di-isopropyl and di-n-butyl esters of phthalic acid; malonic acid dimethyl ester, diethyl ester, di-n-propyl ester or di-n-butyl ester; succinic acid dimethyl ester or di-n-butyl ester; glutaric acid diethyl ester or di-isopropyl ester; adipic acid diethyl ester or di-isobutyl ester; pimelic acid dimethyl ester, di-isopropyl ester or di-n-butyl ester; maleic acid dimethyl ester, di-isopropyl ester or di-n-butyl ester; suberic acid dimethyl ester, diethyl ester, di-n-propyl ester or di-n-butyl ester; 1,4-cyclohexane-dicarboxylic acid dimethyl ester, diethyl ester, di-n-propyl ester or di-n-butyl ester; 1,2-cyclohexane-dicarboxylic acid dimethyl ester, diethyl ester, di-n-propyl ester or di-n-butyl ester and 1,3-cyclohexanedicarboxylic acid dimethyl ester, diethyl ester, di-n-propyl ester or di-n-butyl ester; and phthalic anhydride, maleic anhydride, succinic anhydride and phthalyl chloride.

The phosphonic acids mentioned above under A, (b) have the general formula VI and introduce the chain member of the general formula VII

into the polyester. In these formulae, R has the meaning already given. Examples of suitable phosphonic acids are: methane-, ethane-, n-propane-, i-propane-, n-butane-, n-but-2-ene-, i-butane-, n-octane, i-octane-, decane-, dodecane-, octadecane-, nonadecane- and docosane-phosphonic acid, cyclopentane-, cyclohexane-, benzene-, α-naphthalene- and β-naphthalene-phosphonic acid, 3-oxapentane-phosphonic acid, 4-oxaheptane- and 4,8-dioxaundecane-phosphonic acid and phosphonic acids of the general formula

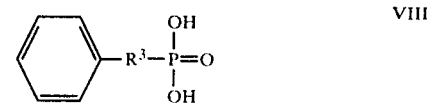

wherein $R^3$ denotes an alkylene radical which has 1 to 12 C atoms and can also be interrupted by one or more oxygen atoms, for example benzyl or phenethyl-phosphonic acid, $C_6H_5CH_2OCH_2CH_2PO(OH)_2$ and $C_6H_5CH_2CH_2OCH_2CH_2OCH_2CH_2PO(OH)_2$.

As already mentioned, the phosphonic acids can also be used in the form of their derivatives, in particular in the form of their monoesters or diesters with low, that is to say easily distillable, monoalcohols, preferably those with 1 to 4 C atoms, or with the dialcohols mentioned below, or in the form of their halides, in particular chlorides, or in the form of their anhydrides. Phosphorous acid is appropriately employed only in the form of its ester, in particular its ester with alcohols with 1 to 4 C atoms, for example as diethyl phosphite.

Suitable dialcohols B for the preparation of the polyester are: B, (a) aliphatic, cycloaliphatic or araliphatic diols, by which there are also to be understood aliphatic or cycloaliphatic diols containing ether groups and aliphatic or cycloaliphatic diols which contain ether groups and have an aromatic ring system in the molecule, and acyl derivatives thereof obtained with highly volatile, lower carboxylic acids ($C_1$ to $C_4$), (b) diesters of phosphonic acids or polyphosphonic acids with diols and (c) mixtures of the diols B, (a) and/or B, (b).

The diols mentioned under B, (a) have the general formula IX and incorporate into the final polyesters chain members of the general formula X

wherein $R^4$ represents a divalent aliphatic, cycloaliphatic or araliphatic radical, the carbon skeleton of which can be interrupted by one or more oxygen atoms (ether bridges) and/or aromatic nuclei and/or $-C_6H_5-SO_2-C_6H_5-$ radicals. In particular, $R^4$ denotes a divalent aliphatic radical with 2 to 6 C atoms, and above all a divalent aliphatic radical which can be interrupted by one or more oxygen atoms (ether bridges) and/or aromatic nuclei (in particular phenylene or naphthylene nuclei) and/or $-O-C_6H_5-SO_2-C_6H_5-O-$ radicals. In the case of such radicals, the given preferred range of 2 to 6 C atoms relates only to an aliphatic member between two oxygen atoms or aromatic nuclei or $-O-C_6H_5-SO_2-C_6H_5-O-$ radicals. Such radicals can have a molecular weight of up to 10,000, and in some cases even higher, and can be derived, for example, from a polyethylene glycol, poly-ethylene-propylene glycol or a polypropylene glycol. $R^4$ in particular also denotes a divalent cycloaliphatic radical with 5 to 10 carbon atoms or a divalent araliphatic radcial which has 8 to 14 carbon atoms and in which the aliphatic part can also be interrupted by one or more oxygen atoms or can be bonded to the aromatic nucleus by oxygen.

Examples of suitable diols are: ethylene glycol; propane-1,2-diol and -1,3-diol (trimethylene glycol); butanediols, in particular butane-1,4-diol; pentanediols, such as pentane-1,5-diol; hexanediols, in particular hexane-1,6-diol; decane-1,10-diol; diethylene glycol and ethylene-1,2-propylene glycol; ethylene-1,3-propylene glycol; dipropylene glycol; triethylene glycol and tetraethylene glycol; tripropylene glycol; polyethylene glycols up to a molecular weight of 10,000; polypropylene glycols up to a molecular weight of 10,000 or more; mixed polyethylene-polypropylene glycols (so-called "Pluronics") up to a molecular weight of 10,000 or more; bis-(4-hydroxybutyl) ether; 2,4-dimethyl-2-ethylhexane-1,3-diol; 2-ethyl-2-butyl-propane-1,3-diol; 2,2-dimethyl-propane-1,3-diol; 2-ethyl-2-isobutyl-propane-1,3-diol; 2,2,4-trimethyl-hexane-1,6-diol; 1,3-dihydroxycyclohexane; 1,4-dihydroxy-cyclohexane (quinitol); 1,4-bis-(hydroxymethyl)-cyclohexane; 1,3-bis-(hydroxymethyl)-cyclohexane; 1,2-bis-(hydroxymethyl)-cyclohexane, 1,4-bis-(hydroxymethyl)-benzene, 1,3-bis-(hydroxymethyl)-benzene, 1,2-bis-(hydroxymethyl)-benzene and 2,6-bis-(hydroxymethyl)-naphthalene. Other suitable diols are, for example, diphenols which have been converted into araliphatic bishydroxy compounds by reaction on both sides with ethylene oxide and to which can be allocated, for example, the general formula

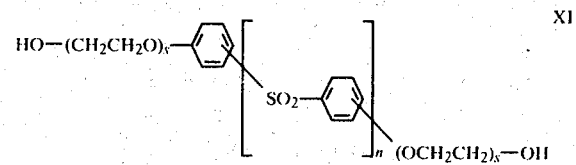

wherein $n=0$ or 1, $s=1$ to 20 and the bonds linked to the benzene nuclei can be in the ortho-, meta- or para-position, or the general formula

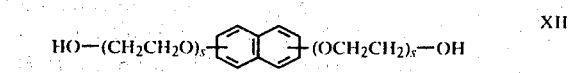

wherein $s=1$ to 20. In suitable representatives of the general formula XI, for example, $n=0$ and $s=1$; $n=1$ and $s=1$; $n=0$ and $s=2$; or $n=1$ and $s=2$.

The representatives of the diols mentioned under B, (a) can also be used in the form of esters with highly volatile carboxylic acids, such as, for example, formic acid, acetic acid or propionic acid.

The diesters, mentioned under B, (b), of phosphonic acids or polyphosphonic acids with diols have, in particular, the following general formulae

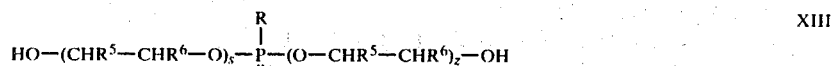

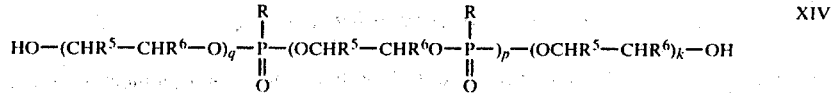

and incorporate into the final polyester the chain members

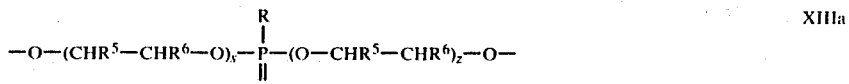

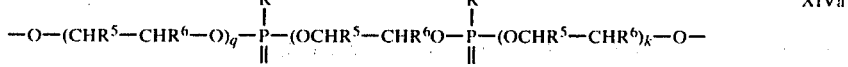

wherein R has the meaning already given, preferably alkyl with 1 to 4 C atoms, especially n-propyl, $R^5$ and $R^6$ denote $-CH_3$, $-C_2H_5$, or preferably H, p denotes 1 to 10, preferably 1 to 2, s and z denote 1 to 20 and q and k denote 0, 1, 2 or 3, preferably 1. It is expedient to use the compounds of the general formulae XIII and/or XIV as mixtures. These compounds can likewise be employed in the form of esters with highly volatile carboxylic acids. The compounds of formula XIV are preferred.

In order to ensure adequate solubility of the finished polyester in water, the diols of group B are chosen such that at least half of the molar amount thereof employed consists of water-soluble representatives which contain ether groups and incorporate into the final polyester the chain members

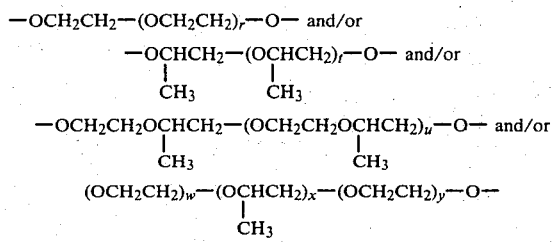

wherein r denotes a number from 1 to 230, preferably 1 and 40 to 53, t denotes a number from 1 to 175 and u denotes a number from 1 to 100. w, x and y are numbers equal to or greater than 1 and have a value such that the grouping achieves a molecular weight of up to 10,000. The abovementioned groupings are incorporated, in particular, by diethylene glycol (r=1), triethylene glycol (r=2), polyethylene glycols (r=4 to 230), dipropylene glycol (t=1) and polyethylene-propylene glycols (u=1 to 100) or by compounds which have a molecular weight of up to 10,000 and are formed by reacting polypropylene glycol with ethylene oxide and which therefore as a rule represent at least half of the molar amount of the compounds of group B employed. Mixtures of diethylene glycol and polyethylene glycol 2,000, above all those containing 20 to 50 mol % of polyethylene glycol 2,000, are preferred.

Instead of in each case one molecule of a dicarboxylic acid of group A and in each case one molecule of a diol of group B, it is also possible to use two molecules of a hydroxy-acid C, or of derivatives thereof, in particular esters thereof with lower monoalcohols or diols or inner esters thereof. Such hydroxy-acids C which can be used can be (a) hydroxycarboxylic acids and (b) hydroxyphosphonic acids or mixtures of the two.

Hydroxycarboxylic acids of the general formula XV incorporate into the final polyester chain members of the general formula XVI

HO—R⁷—COOH      XV

—O—R⁷—CO—      XVI wherein R⁷ represents a divalent aliphatic, cycloaliphatic or araliphatic radical, the carbon skeleton of which can also be interrupted by one or more hetero-atoms, in particular oxygen. R⁷ preferably denotes a divalent aliphatic radical with 1 to 10 carbon atoms, a divalent cycloaliphatic radical with 6 to 11 carbon atoms or a divalent araliphatic radical with 6 or 12 carbon atoms in the aromatic nucleus, it also being possible, in the araliphatic radical, for the aliphatic part to be separated from the aromatic part by a hetero-atom and/or for the aliphatic part to be interrupted by one or more hetero-atoms, in particular oxygen, and, in particular, araliphatic radicals of the general formulae XVII and XVIII

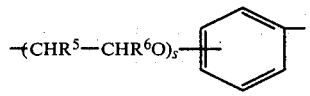

XVII

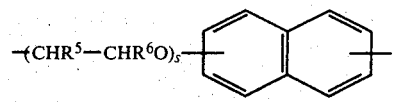

wherein R⁵, R⁶ and s have the meanings already given. Examples of suitable hydroxycarboxylic acids are glycolic acid, lactic acid, 3-hydroxypropionic acid, 4-hydroxybutyric acid, 5-hydroxypentanoic acid, 5-hydroxypentan-3-oic acid, mandelic acid, 3-hydroxymethyl-cyclohexane-carboxylic acid, 4-hydroxymethyl-cyclohexanecarboxylic acid, 6-hydroxymethyl-decalin-2-carboxylic acid and meta- or para-hydroxyethoxybenzoic acid.

Examples which may be mentioned of suitable esters of hydroxycarboxylic acids are: lactic acid methyl ester, lactic acid ethyl ester, 4-hydroxybutyric acid methyl ester, mandelic acid ethyl ester, and para-hydroxyethoxy-benzoic acid methyl ester. Examples of suitable inner esters of hydroxycarboxylic acids are butyrolactone and valerolactone.

In the context of the present invention, as hydroxyphosphonic acids there are understood, in particular, compounds of the general formulae

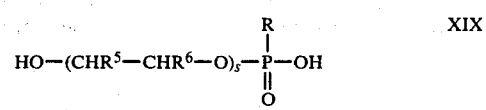

or

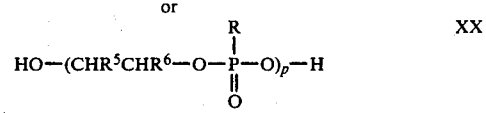

which incorporate into the polyester chain members of the general formulae

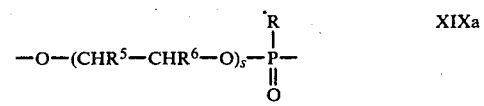

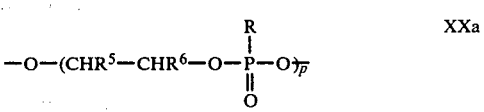

wherein R, R⁵ and R⁶ have the meanings already given, s denotes 1 to 20 and p denotes 1 to 10. Suitable inner esters of hydroxyphosphonic acids are 2-oxo-1,3,2-dioxaphospholanes of the general formula

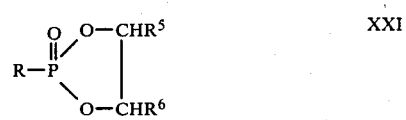

wherein R, R⁵ and R⁶ have the meanings already given. Suitable representatives of such hydroxyphosphonic acids and phospholanes are, for example,

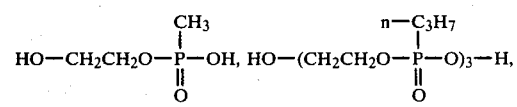

-continued

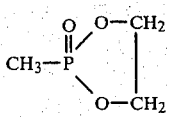

When hydroxy-acids C are employed, half the molar amount is allotted to the dibasic acids of group A and the other half of the molar amount is allotted to the diols of group B. If, for example, m mols of compounds of the general formula XX are used, m.p mols of phosphonic acid ester groups are incorporated into the polyester. For the preparation of the polyester it is, of course, also possible to use instead of the monomeric units A, B or C lower precondensates or oligomers of the abovementioned units, such as i.e.

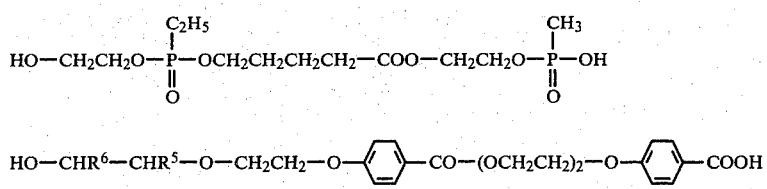

wherein $R^6$ and $R^5$ have the meanings already given. The diesters of the phosphonic acids or polyphosphonic acids of the general formulae XIII or XIV can also be regarded as precondensates or oligomers.

A section of the molecule of the final polyester is built up schematically, for example, from the compounds mentioned for the classes of compounds A, B and C, for example the compounds of the general formulae II, VI, IX, XIII, XIV, XV, XIX and XX, as follows:

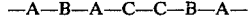

wherein —A—, —B—and —C—represent chain members resulting from one of the compounds mentioned under the classes A, B and C by condensation during the preparation of the polyester. The radicals of the general formulae III, VII, X, XIIIa, XIVa, XVI, XIXa and XXa are examples of such chain members.

The starting materials containing phosphonic acid ester groups are readily accessible, and some of them are inexpensive commercial products (for example from Hoechst AG, Germany); they can readily be prepared by the processes known for the particular class of compounds, as can the other starting materials. The preparation of compounds of the general formulae XIII, XIV, XIX and XX is described, for example, in German Offenlegungsschrift No. 2,726,478.

The polyester contains at least 5%, preferably 20 to 50%, of phosphonic acid ester groups of the formula I relative to all the chain members present in the polyester.

The preparation of the polyesters by condensation of the starting components is carried out in the customary manner under elevated temperature of 100° to 280° C., in particular 150° to 250° C., and preferably under an inert gas atmosphere, such as, for example, under nitrogen or carbon dioxide, and/or under reduced pressure, and advantageously with stirring, the volatile condensation products (water and/or alcohols and/or lower carboxylics acids), and any excess starting components, in most cases a diol, being distilled off. If normal pressure is applied, it may be expedient to apply a vacuum of, for example, 10 to 30 mbars towards the end of the condensation, and then, if appropriate, even a vacuum of about 1 to 3 mbars, or if necessary still lower, in order largely to remove the volatile products. The condensation reaction usually takes 3 to 20 hours and is carried out until the desired apparent average molecular weight of 800 to 5,000, preferably 1,500 to 3,000, is reached. The starting materials used for the condensation reaction can first all be mixed together and then subjected to a conjoint condensation reaction. In this procedure, the units are present in the polyester in random distribution. However, it is also possible to obtain the polyester by first subjecting only some of the starting materials to a pre-condensation reaction and then subjecting the remainder to a further condensation reaction with the precondensate in any sequence and after any interval of time.

The polycondensation reaction can be carried out either with the customary esterification of trans-esterification catalysts or entirely without such catalysts. Examples of esterification or trans-esterification catalysts which can be used are alkali metal hydroxides, such as sodium hydroxide or potassium hydroxide, or alkali metal alcoholates, such as sodium methylate or ethylate, alkaline earth metal oxides or hydroxides, such as, for example, the appropriate calcium or magnesium compounds and also zinc oxide or cadmium oxide, salts of organic carboxylic acids, such as sodium acetate or formate, calcium acetate or formate, manganese acetate or formate or zinc acetate or formate, organic titanium compounds, in particular titanium alcoholates, such as, for example, titanium isopropylate or titanium butylate, and others. The amounts to be applied depend, above all, on the activity of the particular catalyst. The amount of catalyst is usually kept as low as possible. Acid catalysts are not particularly suitable because they convert the preferred diol diethylene glycol into dioxane and thus largely withdraw it from the chain formation reactions.

It is to be assumed that, in the case of some starting components containing phosphonic acid ester groups, breaks in the chain take place in the course of the condensation reaction and the broken pieces join together to form new compounds. Thus, for example, the compound

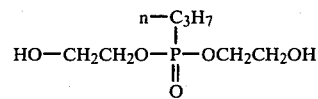

is probably not directly co-condensed in its entirety, but possibly only after rearrangement into

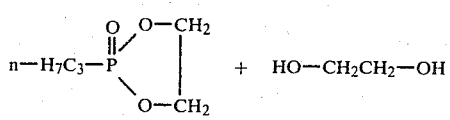
+ HO—CH₂CH₂—OH and via renewed ring-opening by another terminal hydroxyl group. It is also not certain what proportion of the phosphonic acid ester groups is finally incorporated inside the chain and what proportion is incorporated at the end of the chain. The relatively low pH value of the polyesters could point to a high proportion of phosphonic acid half-ester groups at the chain ends. The resulting polyesters are therefore rendered neutral in aqueous solution with alkalis, such as, for example, sodium hydroxide or potassium hydroxide or ammonia. It is expedient to formulate the polyesters obtained into a use concentration of about 30 to about 60% by weight with water.

The apparent average molecular weight is determined in a vapour pressure osmometer, with dimethylformamide as the solvent. The value measured is a sufficiently accurate criterion for characterising the polyesters. (Determination of the molecular weight in a vapour pressure osmometer is described by S. Kume and H. Kobayashi in Makromol. Chem. 79 (1964) 1 to 7).

Optical brighteners which are sparingly soluble to insoluble in water, in particular those from the following classes of compounds and their non-ionic substitution products, can be used for the preparation of the formulations according to the invention: bis-benzoxazole compounds, such as, for example, naphthalene-1,4-bis-2-benzoxazole (compare, for example, German patent specification No. 1,282,592), ethylene-1,2-bis-(5-methyl-2-benzoxazole) (compare, for example, German patent specification No. 1,040,535) and thiophene-2,5-bis-2-benzoxazole; benzoxazole-stilbene compounds, such as, for example, 4-benzoxazol-2-yl-4'-phenylstilbene (compare German Auslegeschrift No. 1,594,834), 4-benzoxazol-2-yl-4'-[3-methyl-1,2,4-oxadiazol-5-yl]-stilbene, 4-benzoxazol-2-yl-4'-carbomethoxy-stilbene and 2-(4-cyanostyryl)-5,6-dimethylbenzoxazole; naphthalimides, such as, for example, 4-methoxy-N-methylnaphthalimide and 4,5-dimethoxy-N-methylnaphthalimide; bis-ethylene-aryls, such as, for example, 1,4-bis-(2-cyano-ω-styryl)-benzene and 1,4-bis-(4-cyano-ω-styryl)-benzene; pyrazolines, such as, for example, 1-(4-sulphamoylphenyl)-3-(4-chlorophenyl)-pyrazoline and 1-(4-(β-hydroxyethylsulphonyl)-phenyl)-3-(4-chlorophenyl)-pyrazoline; coumarins (compare, for example, Belgian patent specifications Nos. 607,116 and 611,489), such as, for example, 3-phenyl-7-(3-methylpyrazol-1-yl)-coumarin and 3-(4-chloro-1,2-pyrazol-1-yl)-7-(3-phenyl-4-methyl-1,2,3-triazol-2-yl)-coumarin; substituted pyrenes (compare German patent specification No. 1,273,479), such as, for example, 4,6-dimethoxy-1,3,5-triazinyl-pyrene; benzofuranylstyryl compounds (compare German patent specification No. 2,105,305); benzofuranyloxadiazole compounds (compare German Offenlegungsschrift No. 2,405,063); and 1,2,4-oxadiazole compounds (compare German Offenlegungsschrift No. 2,709,924).

The formulations according to the invention can, of course, also contain mixtures of two or more optical brighteners. In some cases, synergistic effects are thereby found, that is to say the whitening effect which can be achieved with such a formulation is greater than the whitening effect of formulations of the individual components of the mixture.

The formulations according to the invention consist of aqueous dispersions containing usually 4 to 30% by weight of the optical brightener which is insoluble in water or sparingly soluble in water or of a mixture of two or more such optical brighteners and 5 to 50% by weight, preferably 15 to 25% by weight, relative to the solids, of the water-soluble or water-dispersible polyester containing phosphonic acid ester groups, and if appropriate other customary additives, such as, for example, anti-foaming agents, wetting agents, fungicides, grinding auxiliaries and the like. To prepare the formulation according to the invention, the starting components, that is to say water, the optical brightener or a mixture of optical brighteners, the water-soluble or water-dispersible polyester containing phosphonic acid ester groups and, if appropriate, other additives, are converted into a dispersion by wet grinding processes which are in themselves known. In this procedure, the starting components are ground in a stirred ball mill, for example with sand or glass balls as the grinding body, until the desired fine division of the optical brightener is reached. As a rule, grinding is continued until 90% of all the particles of the optical brightener have achieved a size of 2 μm or less. The grinding body is then sieved off. It is expedient to employ the polyester containing phosphonic acid ester groups in the form of a neutral 30 to 60% strength by weight, preferably 40 to 55%, strength by weight, aqueous solution or dispersion. It has proved expedient to add only some of the total amount of polyester containing phosphonic acid ester groups before the grinding operation and to stir in the remainder, if appropriate together with the other auxiliaries and further water, only when the grinding operation has ended.

The amount of polyester containing phosphonic acid ester groups which is added for the grinding operation can vary within wide limits and depends, above all, on the viscosity of the grinding batch: 3 to 15% by weight of the total amount of polyester containing phosphonic acid ester groups is preferably added for the grinding. In some cases, it can be expedient additionally to introduce customary anionic or cationic grinding auxiliries, the cationic grinding auxiliaries also providing a fungicidal protection for the formulation.

The formulations according to the invention are outstandingly stable on storage. The test for storage stability is carried out on a 50 ml sample by static storage at 50° C. for 6 weeks. After this time, the fine division must still be just as good as in the freshly prepared sample, that is to say the brightener should not have aggregated or even recrystallised. It must be possible easily to stir up a slight sediment—such a sediment forms in most cases. After this storage time, the formulation must, of course, have the same tinctorial properties as a freshly prepared formulation.

The test for fine division during the grinding operation and during testing for storage stability is effected on a sample containing about 0.5 to 1% of optical brightener, under an optical microscope with a magnification of about 400.

The formulations according to the invention are used for brightening materials of synthetic fibres, such as, for example, fibre materials of polyacrylonitrile, polyamide and, preferably, polyester, 2½ acetate and triacetate or mixtures of these fibres with natural fibres, such as, for example, cotton. The fibre materials can be in the most diverse forms, for example as woven fabrics, knitted fabrics or as looped goods of filament fibres or staple fibres. The formulations according to the invention are used, for brightening the fibre materials mentioned, in a manner which is in itself known in accordance with the customary dyeing processes, for example by the high temperature process, but in particular by the thermosol process and the hot air fixing process. In the high temperature process, the material to be brightened is treated for 30 to 45 minutes, at temperatures of 90° to 130° C., with dye liquors which contain the active optical brightener substance in concentrations of 0.01 to 1.0% by weight, relative to the weight of the goods. The liquors can also contain commercially available dyeing auxiliaries. In the thermosol process, the textile material is impregnated with a liquor which contains 0.25 to 1.5 g/l of the active brightener substance. It is then squeezed off to a weight increase of about 50 to 120% by weight and, as a rule, intermediately dried, and the goods are then exposed to brief treatment with dry heat. However, it is also possible to allow the formulations according to the invention to be absorbed onto the goods, from a long liquor, and subsequently to squeeze off the goods, to dry them and then to subject them to the thermosol process.

The formulations according to the invention exhibit outstanding tinctorial properties, in particular an increase in the degree of whiteness or a reduction in the amount of brightener required to achieve the same degree of whiteness as in the case of formulations without the polyester containing phosphonic acid ester groups.

The apparent, average molecular weight is determined in a vapour pressure osmometer, in dimethylformamide as the solvent. The actual average of the molecular weight is higher than the apparent value thus measured because of dissociation of the acid groups or salts thereof. However, the value measured is a sufficiently accurate criterion for characterising the degree of condensation of the mixed polyester according to the invention and for determining the end point of the condensation reaction.

The term aliphatic used in the context of the present invention, also in connection with the term araliphatic, represents, in particular, alkenyl or alkenylene radicals and, above all, alkyl or alkylene radicals. Cycloaliphatic radicals are, in particular, cycloalkyl or cycloalkylene radicals. Aromatic radicals, also in connection with the term araliphatic, are, in particular, those which contain a radical derived from benzene or naphthalene.

In the following examples, unless otherwise indicated, the percentage data denote percentages by weight. $W_B$ denotes Berger whiteness and $W_S$ denotes Stensby whiteness. The number given after the polyethylene glycols in the molecular weight.

EXAMPLE 1

(a) Preparation of the Formulation 15 g of the optical brightener of the formula

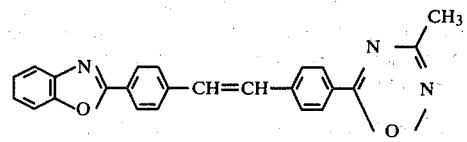

2 g of a 55% strength solution of a water-soluble polyester which contains phosphonic acid ester groups and is prepared as described below under (c), 1 g of a 50% strength solution of (coconut alkyl)-dimethylbenzylammonium chloride and 21 g of desalinated water are ground in a 1 liter stirred ball mill with 400 g of glass beads 1 mm in diameter. After about 6 to 7 hours, the required fineness of grinding (90% of all the particles of the optical brightener are 2 μm or smaller in size) is achieved and 76 g of the 55% strength solution of the polyester containing water-soluble phosphonic acid ester groups are added, the mixture is stirred for a further 30 minutes and the grinding body is then sieved off. 25 g of this ground material are now stirred with 8.4 g of the 55% strength solution of the water-soluble polyester containing phosphonic acid ester groups, and 13.0 g of desalinated water.

A brightener formulation which contains 7% of active brightener substance and 30% of the water-soluble polyester containing phosphonic acid ester groups is obtained.

(b) Use of the Formulation 14.3 g of the above brightener formulation are stirred into 1 liter of water. A polyester fabric is immersed in this dye liquor and is squeezed off, between two rollers, to a weight increase of 70%. The polyester fabric is then dried at 110° C. and subsequently subjected to hot air treatment at 190° C. for 30 seconds.

For comparison, 100 mg of the abovementioned optical brightener are dissolved in 100 ml of dimethylformamide under the influence of heat, 5 ml of an emulsifier are then added and this clear solution is poured into a solution of 8.5 ml of the same emulsifier in 76.5 ml of water, whilst stirring, and a dispersion which contains 1 g/liter of the optical brightener is thus obtained. If dyeing is now carried out under the same conditions as indicated above, the following results are obtained:

| | $W_B$ | $W_S$ |
|---|---|---|
| Comparison: | 161 | 157 |
| Formulation according to the invention | 164 | 162 |

If a dispersion which contains 7% of brightener and 4% of a partly saponified polyvinyl alcohol is prepared, in a manner similar to that described above, by grinding in a stirred ball mill and dyeing is carried out as desribed above, only a dull, yellowish-green white is obtained on polyester fabric.

(c) Preparation of the Polyester Containing Phosphonic Acid Ester Groups 140.4 g (=0.3 mol) of the oligo-adduct of the formula

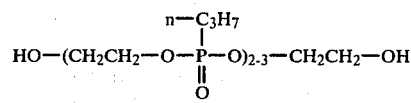

(commercial product from Hoechst AG, Frankfurt am Main), 69 g (=0.65 mol) of diethylene glycol, 200 g (32 0.2 mol) of polyethylene glycol 2,000 77.6 g (=0.4 mol) of dimethyl terephthalate and 4 g of titanium tetraisopropylate as the catalyst are heated to 150° C. in the course of one hour, under nitrogen and whilst stirring well in a 2 liter four-necked flask with ground glass joints and with a stirrer, thermometer, gas inlet tube and descending condenser. The temperature is then increased by 10° C. per hour, until the internal temperature reaches 200° C. 74.8 g of 99% pure isophthalic acid (=0.45 mol) are now stirred in and the temperature is then uniformly increased further to 220° C. in the course of 2 hours. The mixture is then heated, whilst stirring well, at 220° to 225° C. for 4 hours, at 230° to 235° C. for 2 hours and at 240° to 245° C. for 2 hours. At the latter temperature, a vacuum of about 20 mbars is then applied for a further 4 hours, and finally a vacuum of 1 to 3 mbars is applied. 600 g of a light-coloured melt are obtained and are diluted to 1,091 g with water and about 60 g of 27% strength sodium hydroxide solution, to give a 55% strength, neutral, colourless, somewhat viscous solution. A slight turbidity can easily be removed by stirring with 1 to 2% of kieselguhr and pressing off over a pressure filter. The average apparent molecular weight of this polycondensate is 1,850. The melt can, of course, also be diluted to other suitable concentrations.

Polyester components which are particularly suitable for the preparation of the formulations according to the invention are also obtained with the following slight modifications to the above manufacturing instructions.

Modification 1: Instead of 0.2 mol of polyethylene glycol 2,000 0.1 mol of polyethylene glycol 1,000 and 0.1 mol of polyethylene glycol 3,000 are used.

Modification 2: Instead of 0.2 mol of polyethylene glycol 2,000, 0.15 mol of polyethylene glycol 1,000 and 0.5 mol of polyethylene glycol 6,000 are used.

Modification 3: Instead of isophthalic acid, the equivalent amount of succinic anhydride is used.

Modification 4: Instead of 0.4 mol of dimethyl terephthalate and 0.45 mol of isophthalic acid, 0.85 mol of dimethyl isophthalate is used.

Modification 5: Instead of 0.65 mol of diethylene glycol, the equivalent amount of neopentylglycol is used.

EXAMPLE 2

(a) Preparation of the Formulation 6.5 g of the brightener of the following formula

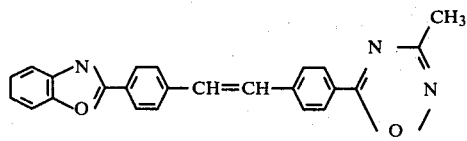

and 0.5 g of the brightener of the formula

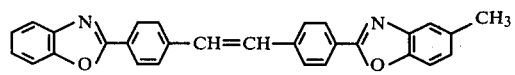

5 g of a 40% strength aqueous solution of a polyester which contains phosphonic acid ester groups and which is prepared as described below under (c), and 11 g of desalinated water are ground in a stirred ball mill with 200 g of glass beads (1 mm diameter), whilst cooling with water. After about 6 to 7 hours, the required fine division (90% of the particles are $\lesssim 2$ μm in size is reached, and a further 45 g of the 40% strength solution of the water-soluble polyester containing phoshonic acid ester groups and 32 g of desalinated water are added, the mixture is stirred for a further ½ hour and the grinding body is then sieved off.

(b) Use of the Formulation

If dyeing on polyester is carried out as indicated in Example 1 (b), white effects which are 4 whiteness units greater than the comparison dyeing are obtained.

(c) Preparation of the Polyester Containing Phosphonic Acid Ester Groups 234 g (=0.5 mol) of the commercial product from Hoechst AG, Frankfurt am Main, mentioned in Example 1c, 26.5 g (=0.25 mol) of diethylene glycol, 1,000 g (=0.5 mol) of polyethylene glycol 2,000 77.6 g (=0.4 mol) of dimethyl terephthalate and 8 g of titanium tetraisopropylate as the catalyst are heated to 150° C. in a 2 liter four-necked flask with ground glass joints and with a stirrer, thermometer, gas inlet tube and descending condenser in the course of one hour, under nitrogen and whilst stirring well. The temperature is then increased by 10° C. per hour until the internal temperature reaches 200° C. 66.4 g of 99% pure isophthalic acid (=0.4 mol) are now stirred in and the temperature is then uniformly increased further to 220° C. in the course of 2 hours. The mixture is then heated, whilst stirring well, at 220° to 225° C. for 4 hours, at 230° to 235° C. for 2 hours and at 240° to 245° C. for 2 hours. At the latter temperature, a vacuum of about 20 mbars is then applied for a further 2 hours and, finally, a vacuum of 1 to 3 mbars is applied for a further 2 hours. 1,250 g of a light-coloured melt are obtained and are diluted to 3,125 g with water and about 80 g of 27% strength sodium hydroxide solution to give a 40% strength neutral, colourless, somewhat viscous solution. A slight turbidity can easily be removed by stirring with 1 to 2% kieselguhr and pressing off over a pressure filter. The average apparent molecular weight of this polycondensate is 1,400.

EXAMPLE 3

(a) Preparation of the Formulation 7 g of the optical brightener of the following formula

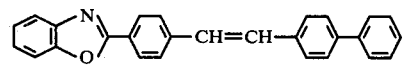

5 g of a 40% strength solution of a water-soluble polyester which contains phosphonic acid ester groups and is prepared as described below under (c), and 11 g of desalinated water are ground in a stirred ball mill as described under Example 2(a). When the grinding has ended, a further 59.5 g of the 40% strength solution of the polyester containing phosphonic acid ester groups, and 17.5 g of desalinated water are added.

(b) Use of the Formulation

When the dyeing and comparison dyeing are carried out according to Example 1(b), equally good white effects are obtained.

(c) Preparaation of the Polyester Containing Phosphonic Acid Ester Groups 95.4 g (=0.9 mol) of diethylene glycol, 85 g (=0.05 mol) of Pluriol PE 4300 (BASF, ethylene oxide is grafted onto polypropylene glycol with a molecular weight of about 1,100 until the final molecular weight is about 1,700), 97 g (=0.5 mol) of dimethyl terephthalate and 2 g of titanium tetraisopropylate are heated to 150° C. in the experimental apparatus of Example 1(c) in the course of one hour, and is heated to 160° C. in the course of a further hour, always under nitrogen and whilst stirring well, whereupon methanol distils off. 46 g (=0.1 mol) of the commercial product from Hoechst AG, Frankfurt am Main, mentioned in Example 1c, are now mixed in and the mixture is heated further to 180° C. in the course of 2 hours. At this temperature, 83 g (=0.5 mol) of pure isophthalic acid are added. The temperature is then increased to 210° C. in the course of 3 hours, whilst stirring vigorously, and the mixture is kept at 210° to 215° C. for 2 hours. A vacuum of about 20 mbars is then applied and the mixture is stirred at the above temperature for a further 2 hours. Finally, a vacuum of about 2 mbars is applied for a further 2 hours. 343 g of a light-coloured melt which has an average, apparent molecular weight of 2,150 and can easily be diluted to 858 g with distilled water and about 25 g of 27% strength sodium hydroxide solution, to give an almost colourless 40% strength solution of pH 6.5 to 7, are obtained as the residue. If necessary, a slight turbidity can easily be removed as described in Example 1 (c).

EXAMPLE 4

(a) Preparation of the Formulation 7 g of the optical brightener of the following formula

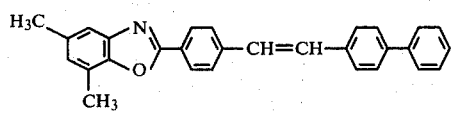

5 g of a 40% strength solution of the water-soluble polyester containing phosphonic acid ester groups which is described in Example 2, 1 g of a 50% strength solution of (coconut alkyl)dimethylbenzylammonium chloride and 22 g of desalinated water are ground in a stirred ball mill with glass beads, whilst cooling with water, until the required fine division is achieved. A further 30 g of the 40% strength solution of the above water-soluble polyester and 5 g of desalinated water are then added, the mixture is stirred for about a further hour and the grinding body is then separated off. 70 g of a brightener formulation which contains 10% of active brightener substance and 20% of the water-soluble polyester containing phosphonic acid ester groups are obtained.

(b) Use of the Formulation

Dye liquors which contained 0.5 g and 1.0 g of the active brightener substance per liter were prepared using the formulation obtained. Polyester fabrics are dyed in these liquors by the pad-thermosol process, the thermosol process being carried out at 190° C. for 30 seconds. For comparison, dyeings were produced under comparable conditions using a commercial dispersion of the same active brightener substance. The following results were obtained:

| Active substance content of the liquor | 0.5 g/l | | 1 g/l | |
|---|---|---|---|---|
| | $W_B$ | $W_S$ | $W_B$ | $W_S$ |
| Commercial dispersion | 156 | 154 | 164 | 158 |
| Formulation according to the invention | 163 | 159 | 170 | 164 |

EXAMPLE 5

If, instead of the active brightener substance from Example 4, the following optical brightener

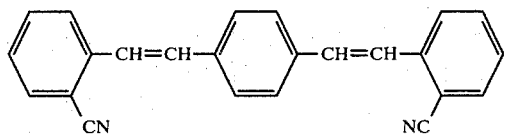

is used and the procedure is otherwise as indicated in Example 4, a formulation is obtained which gives the following white effects, compared with those of a commercial dispersion of the same optical brightener, when used in the pad-thermosol process at 190° C. for 30 seconds.

| Active substance content of the liquor | 0.5 g/l | | 1.0 g/l | |
|---|---|---|---|---|
| | $W_B$ | $W_S$ | $W_B$ | $W_S$ |
| Commercial dispersion | 160 | 158 | 163 | 160 |
| Formulation according to the invention | 166 | 159 | 168 | 162 |

EXAMPLE 6

(a) Preparation of the Formulation

A suspension of 7 g of the active brightener substance from Example 1, 5 g of a 40% strength solution of the polyester containing phosphonic acid ester groups which is described below and 15 g of desalinated water are ground in a stirred ball mill, whilst cooling with water, until the required fine division is achieved (compare Example 2 (a). A further 45 g of the 40% strength solution of the polyester and 28 g of desalinated water are added, the mixture is stirred for about a further ½ hour and the grinding body is then separated off.

(b) Using the formulation prepared, dyeings and comparison dyeings were produced as indicated in Example 1 (b). The following results were thereby obtained:

| Active substance content of the liquor | 0.5 g/l | | 1.0 g/l | |
|---|---|---|---|---|
| | $W_B$ | $W_S$ | $W_B$ | $W_S$ |
| Comparison | 158 | 158 | 165 | 161 |
| Formulation according to the invention | 165 | 161 | 171 | 166 |

(c) Preparation of the Polyester Containing Phosphonic Acid Ester Groups 152.1 g of the commercial product from Hoechst AG, Frankfurt am Main, mentioned in Example 1 (c), 39.2 g of diethylene glycol, 200 g of polyethylene glycol 2000, 38.8 g of dimethyl terephthalate and 2 g of titanium tetraisopropylate as the catalyst are heated to 150° C. in the experimental apparatus of Example 1 (c) in the course of one hour, under nitrogen, and then to 200° C. in the course of a further 5 hours. 33.2 g of 99% pure isophthalic acid are then stirred in, avoiding entry of air, and the temperature in the flask is increased to 220° C. in the course of 3 hours. The mixture is then stirred for a further 2 hours at 220° to 225° C. under a vacuum of 10 to 20 mbars and for a further 2 hours under a fine vacuum of 1 to 4 mbars. 321 g of a light-coloured melt with an average apparent molecular weight of 1,560 are obtained as the residue and, whilst still warm, at about 90° C., are diluted and neutralised with warm water and about 70 g of 27% strength sodium hydroxide solution, to give a total yield of 803 g, corresponding to a 40% strength, light-coloured, somewhat viscous solution.

Suitable polyesters are also obtained if the dimethyl terephthalate in the above example is replaced by an equivalent amount of adipic acid dimethyl ester, succinic acid dimethyl ester, cyclohexane-1,4-dicarboxylic acid di-n-propyl ester, naphthalene-1,4-dicarboxylic acid dimethyl ester or itaconic acid dimethyl ester.

EXAMPLE 7

If, instead of the water-soluble polyester given in Example 2, the polyesters described below are used, similarly good white effects are obtained.

(a) 23.4 g of the commercial product mentioned in Example 1 (c), 34.5 g of diethylene glycol, 300 g of polyethylene glycol 2000 and 43.65 g of dimethyl terephthalate, with 1 g of titanium propylate as the catalyst, are heated to 150° C. in the apparatus of Example 1 (c) for one hour, under nitrogen, and the temperature is then gradually increased to 200° C. in the course of 5 hours. 41.5 g of pure isophthalic acid are then added. The reaction temperature is increased to 220° C. in the course of 2 hours and is kept at 220° to 225° C. for 2 hours and a vacuum initially of about 16 mbars and then of about 1.3 mbars is applied at this temperature, in each case for one hour. 410 g of a light-coloured melt are obtained and are allowed to cool to 90° C. and then diluted to 1,025 g with warm water of 50° C. and about 5 g of 27% strength sodium hydroxide solution, to give a neutral, somewhat viscous 40% strength solution. The apparent average molecular weight is 1,500.

(b) 53 g (0.5 mol) of diethylene glycol, 300 g (0.15 mol) of polyethylene glycol 2000, 29 g (0.15 mol) of dimethyl terephthalate and 1 g of titanium tetraisopropylate are heated to 150° C. in the experimental apparatus of Example 1 (c) in the course of one hour, under nitrogen. The condensation temperature is increased to 200° C. in the course of 5 hours. 24.9 g (0.15 mol) of pure isophthalic acid are now added, the mixture still being under nitrogen, and the temperature is increased to 220° C. in the course of 3 hours. The contents of the flask are now allowed to cool again to 180° C. and only now are 33 g (0.3 mol) of dimethyl phosphite added dropwise. The mixture is stirred for a further 2 hours at 220° to 225° C., under nitrogen, and then for 1 hour at the same temperature and under a vacuum of about 20 mbars, and finally for a further hour under a fine vacuum of about 1.3 mbars. 395 g of a light-coloured melt, which can easily be diluted with water and about 45 g of 27% strength sodium hydroxide solution to give a neutral, somewhat viscous 40% strength solution, are obtained as the residue.

The average apparent molecular weight is 2,100 and the yield is 988 g.

EXAMPLE 8

Similarly high white effects to those in Example 1, especially in the pad-thermosol process, are obtained using the two water-soluble polyesters, the preparation of which is described below:

(a) 26.5 g (0.25 mol) of diethylene glycol, 15.6 g (0.2 mol) of neopentylglycol, 400 g (0.2 mol) of polyethylene glycol 2000, 29.1 g (0.15 mol) of dimethyl terephthalate and 2 g of titanium tetraisobutylate as the catalyst are heated, in the same experimental apparatus as in Example 1 (c), to 150° C. in the course of one hour and to 180° C. in the course of a further 3 hours. 60.8 g (0.4 mol) of propanephosphonic acid dimethyl ester are then stirred in, with exclusion of air, and the temperature in the flask is increased to 200° C. in the course of 2 hours. 24.9 g of 99% pure isophthalic acid are mixed in and the reaction temperature is increased to 215° C. in the course of two hours. The mixture is kept at 210° to 215° C. for 3 hours and, at this temperature, initially a vacuum of 10 to 20 mbars is applied for 1 hour and then a vacuum of 1 to 4 mbars is applied for 2 hours. 508 g of a light-coloured melt remain as the residue and are diluted to 1,270 g, and simultaneously neutralised, with water and about 20 g of 27% strength sodium hydroxide solution. A light-coloured, somewhat viscous 40% strength solution is obtained. The average apparent molecular weight is 1,900.

Suitable polyesters with somewhat modified properties are obtained if the 0.4 mol of propanephosphonic acid dimethyl ester in the above process is replaced by: 0.3 mol of methanephosphonic acid diethyl ester, 0.25 mol of dodecanephosphonic acid dimethyl ester, 0.25 mol of phenylmethanephosphonic acid dimethyl ester, 0.2 mol of $C_6H_5CH_2OCH_2CH_2PO(OCH_3)_2$, 0.25 mol of cyclohexanephosphonic acid di-n-propyl ester or 0.2 mol of naphthalene-2-phosphonic acid dimethyl ester.

(b) 16 g (0.15 mol) of diethylene glycol, 400 g (0.2 mol) of polyethylene glycol 2000, 34 g (0.175 mol) of dimethyl terephthalate, 34 g (0.175 mol) of dimethyl isophthalate and 1 g of titanium acetylacetonate as the catalyst are heated to 150° C. in the apparatus used in Example 1 (c) in the course of one hour, under nitrogen. The temperature is increased to 180° C. in the course of 3 hours and 45 g (0.3 mol) of 2-oxo-2-propyl-1,3,2-dioxa-phospholane are then added, with exclusion of air. The temperature is increased to 240° C. in the course of 5 hours and, at this temperature, a waterpump vacuum (about 16 mbars) is then applied for 1 hour and an oil pump vacuum (about 1.3 mbars) is applied for 1 hour. 493 g of a light-coloured melt are obtained as the residue and are diluted to 1,233 g with water and about 20 g of 27% strength sodium hydroxide solution to give a neutral, somewhat viscous 40% strength solution. The average apparent molecular weight is 1,660.

EXAMPLE 9

(a) Preparation of the Formulation

The formulation is prepared as indicated in Example 1 (a), 7% of the active substance mentioned in Example 1 (a) and 20% of a water-soluble polyester containing phosphonic acid ester groups, the preparation of which is described in Example 6 (c), being employed.

The brightener formulation obtained gives good white effects, in particular also in the high temperature process.

(b) Use of the Formulation

For the comparison dyeing, a dispersion of the optical brightener is prepared as indicated in Example 1 (b), using dimethylformamide.

Dyeing by the High Temperature Process

Pieces of fabric of polyester filament are pre-washed in the customary manner and then treated in a Linitest apparatus at 120° C. for 45 minutes with a dye liquor which contains 0.04% of active substance. The fabric is then finished in the customary manner. The following results are obtained:

|  | $W_B$ | $W_S$ |
|---|---|---|
| Comparison | 159 | 158 |
| Formulation according to the invention | 163 | 160 |

EXAMPLE 10

(a) Preparation of the Formulation

The formulation is prepared as indicated in Example 1 (a), 7% of the active substance mentioned in Example 1 (a) and 20% of a water-soluble polyester containing phosphonic acid ester groups, the preparation of which is described below, being employed.

The resulting brightener formulation gives good white effects, in particular also in the high temperature process.

(b) Use of the Formulation

For the comparison dyeing, a dispersion of the optical brightener is prepared as indicated in Example 1 (b), using dimethylformamide.

Dyeing by the High Temperature Process

Pieces of fabric of polyester filament are pre-washed in the customary manner and are then treated in a Linitest apparatus at 120° C. for 45 minutes with a dye liquor which contains 0.04% of active substance. The fabric is then finished in the customary manner. The following results are obtained:

|  | $W_B$ | $W_S$ |
|---|---|---|
| Comparison | 159 | 158 |
| Formulation according to the invention | 161 | 159 |

(c) Preparation of the Polyester Containing Phosphonic Acid Ester Groups 34.5 g (0.325 mol) of diethylene glycol, 50 g (0.05 mol) of polyethylene glycol 1000, 150 g (0.05 mol) of polyethylene glycol 3000, 38.8 g (0.2 mol) of dimethyl terephthalate and 1 g of titanium isopropylate as the catalyst are heated to 150° C. in the experimental apparatus of Example 1 (c) in the course of one hour, under nitrogen, and the mixture is then heated further to 170° C. in the course of 2 hours. 70.2 g (0.15 mol) of the commercial product mentioned in Example 1 (c), from Hoechst AG, Frankfurt am Main, are then added and the temperature in the flask is increased to 200° C. in the course of 2 hours. 37.4 g of pure isophthalic acid are added at this temperature and the temperature is increased to 230° C. in the course of 5 hours. A vacuum of 10 to 20 mbars is then applied at this temperature for a further 2 hours, and a vacuum of 1 to 4 mbars is applied for a further hour. 329 g of a light-coloured melt with an average apparent molecular weight of 1,990 are obtained as the residue and are diluted to 823 g with water and about 35 g of 27% strength sodium hydroxide solution, to give a neutral 40% strength, somewhat viscous solution.

The properties of the polyester can be modified if, instead of the isophthalic acid, an equivalent amount of glutaric acid, cyclohexane-1,3-dicarboxylic acid, suberic acid, 2,5-naphthalenedicarboxylic acid, sebacic acid, 3-carboxyphenylacetic acid or HOOC—CH$_2$C-H$_2$O—1,4—C$_6$H$_4$—OCH$_2$CH$_2$COOH is employed.

We claim:

1. The formulation for brightening synthetic fibers or mixtures of synthetic fibers and natural fibers, which is an aqueous dispersion comprising at least one finely divided optical brightener and a dispersing agent, wherein the improvement comprises the dispersing agent being a water-soluble or water-dispersible polyester containing at least one phosphonic acid ester moiety.

2. The formulation according to claim 1 containing 4 to 30% by weight of total optical brightener and 5 to 50% by weight of the polyester dispersing agent.

3. The formulation according to claim 2 containing 15 to 25% by weight of the polyester dispersing agent.

4. The formulation according to claim 1 wherein the polyester has an apparent average molecular weight of 800 to 5,000 and contains at least 5% of chain members which contain at least one phosphonic acid ester moiety of the formula

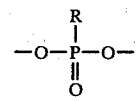

wherein R is hydrogen or an aliphatic, cycloaliphatic, aromatic or araliphatic moiety and wherein the aliphatic moiety and the aliphatic part of the araliphatic moiety can also be interrupted by at least one oxygen atom.

5. The formulation according to claim 4 wherein the polyester molecular weight is 1,000 to 3,000 and R is hydrogen, an aliphatic moiety with 1 to 22 carbon atoms, an aliphatic moiety with 1 to 22 carbon atoms at least one oxygen atom, a cycloaliphatic moiety with 5 to 8 carbon atoms, phenyl or naphthyl, said phenyl or naphthyl being unsubstituted or substituted by up to 3 alkyls having 1 to 6 carbon atoms and said aliphatic moiety is unsubstituted or substituted by phenyl and has 1 to 12 carbon atoms in the aliphatic moiety which may also be interrupted by at last one oxygen atom.

6. The formulation according to claim 5 wherein the polyester comprises a plurality of chain unit members selected from

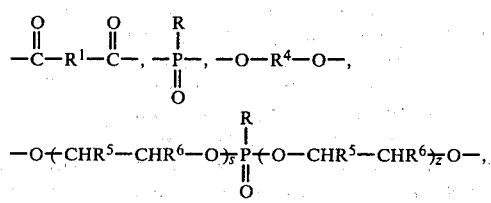

-continued

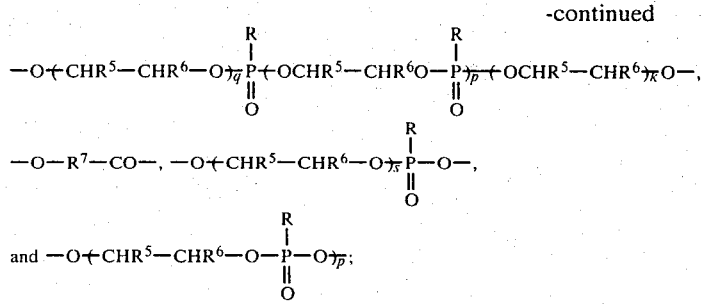

wherein
R¹ is a direct bond or a divalent aliphatic, cycloaliphatic, aromatic or araliphatic moiety, the carbon skeleton of which can also be interrupted by an oxygen, sulphur or —SO₂—;

R⁴ is a divalent aliphatic, cycloaliphatic or araliphatic moiety, the carbon skeleton of which can also be interrupted by at least one oxygen atom, phenylene, naphthylene or —C₆H₅—SO₂—C₆H₅—;

R⁵ and R⁶ are independently hydrogen, methyl or ethyl;

R⁷ is a divalent aliphatic, cycloaliphatic or araliphatic moiety, the carbon skeleton of which can also be interrupted by at least one oxygen atom;

s ans z are independently a number from 1 to 20;
p is a number from 1 to 10;
and q and k are independently the number 0, 1, 2 or 3.

7. The formulation according to claim 1 wherein the optical brightener is insoluble in water or sparingly soluble in water and is selected from the classes of brighteners consisting of mono- and bis-benzoxazoles, pyrenes, bis-ethylene-aryls, aryltriazoles, naphthoxazoles, benzo- or naphtho-furanes, coumarins, naphthalimides, pyrazolines and mixtures thereof.

8. The process for preparation of formulation according to claim 1 wherein optical brightener, a water-soluble or water-dispersible polyester containing phosphonic acid ester moieties and water are subjected to wet grinding until 90% of all the particles of the optical brightener have achieved a size of 2 μm or less.

9. The process according to claim 8 wherein 3 to 15% by weight of the total amount of polyester containing phosphonic acid ester moieties is wet ground with the optical brightener and the remaining portion of the polyester is admixed when the wet grinding has ended.

10. In the process for optical brightening of materials of synthetic fibers or mixtures of synthetic fibers and natural fibers, the improvement comprises impregnating the material with a liquor containing a formulation according to claim 1, squeezing off excess liquor and then subjecting the material to the thermosol process.

11. The formulation according to claim 5 wherein the polyester comprises a plurality of chain unit members selected from

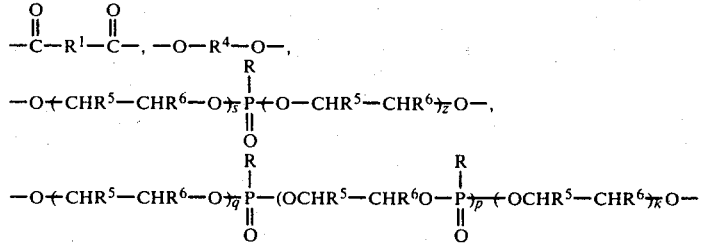

12. The formulation according to claim 11 wherein R¹ is

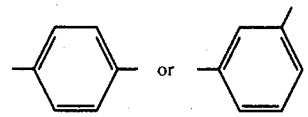

13. The formulation according to claim 11 wherein R⁴ is

—CH₂CH₂—(OCH₂CH₂)ᵣ— wherein r denotes a number from 1 to 230.

14. The formulation according to claim 11, wherein the polyester contains chain members of the formula $$-O-(CH_2CH_2O-\underset{\underset{O}{\|}}{\overset{nC_3H_7}{P}}-O)_{2-3}-CH_2CH_2-O-$$

15. The formulation according to claim 11 wherein the polyester comprises a plurality of chain unit members selected from

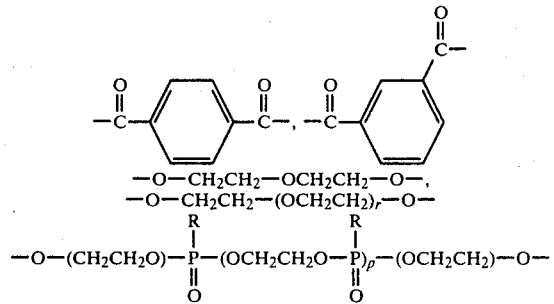

wherein r denotes a number from 40 to 53 and R denotes alkyl with 1 to 4 C atoms and p denotes 1 to 2.

* * * * *

UNITED STATES PATENT OFFICE
CERTIFICATE OF CORRECTION

Page 1 of 3

Patent No. 4,304,569  Dated December 8, 1981

Inventor(s) Friedrich Engelhardt et al

It is certified that error appears in the above-identified patent and that said Letters Patent are hereby corrected as shown below:

Cols. 5 & 6, formula XIVa change:
$$\text{"} -O-(CHR^5-CHR^6-O)_q - \underset{\underset{O}{\|}}{\overset{R}{\underset{|}{P}}} - (OCHR^5-CHR^6O - \underset{\underset{O}{\|}}{\overset{R}{\underset{|}{P}}} - \text{"}$$

to
$$-- \quad -O-(CHR^5-CHR^6-O)_q - \underset{\underset{O}{\|}}{\overset{R}{\underset{|}{P}}} - (OCHR^5-CHR^6O - \underset{\underset{O}{\|}}{\overset{R}{\underset{|}{P}}} -)_p - (OCHR^5-CHR^6)_k - O- \quad --$$

Col. 8, formula XIXa change:

$$\text{"} -O-(CHR^5-CHR^6-O)_s - \underset{\underset{O}{\|}}{\overset{R}{\underset{|}{P}}} - \text{"}$$

to $--$ $$-O-(CHR^5-CHR^6-O)_s - \underset{\underset{O}{\|}}{\overset{R}{\underset{|}{P}}} -O- \quad --$$

UNITED STATES PATENT OFFICE
CERTIFICATE OF CORRECTION

Patent No. 4,304,569  Dated December 8, 1981

Inventor(s) Friedrich Engelhardt et al

It is certified that error appears in the above-identified patent and that said Letters Patent are hereby corrected as shown below:

Col. 22, claim 5, lines 49-50 change

"1 to 22 carbon atoms at least one oxygen atom," to

-- 1 to 22 carbon atoms and at least one oxygen atom,--

Col. 23, claim 6, line 43 change "s ans z" to --s and z--

Col. 16, Example 2(c), line 14 change "polyethylene glycol 2,000 77.6g" to --polyethylene glycol 2,000, 77.6g --

UNITED STATES PATENT OFFICE
CERTIFICATE OF CORRECTION

Patent No. 4,304,569      Dated December 8, 1981

Inventor(s) Friedrich Engelhardt et al

It is certified that error appears in the above-identified patent and that said Letters Patent are hereby corrected as shown below:

Col. 16, Example 3(c), line 64, change "Preparaation" to --Preparation--.

Signed and Sealed this

Thirteenth Day of July 1982

[SEAL]

Attest:

GERALD J. MOSSINGHOFF

Attesting Officer     Commissioner of Patents and Trademarks